(12) United States Patent
Rowe et al.

(10) Patent No.: US 11,912,414 B2
(45) Date of Patent: Feb. 27, 2024

(54) COCKPIT CENTER CONSOLE ARMREST

(71) Applicant: Textron Aviation Inc., Wichita, KS (US)

(72) Inventors: Frank Joseph Rowe, Wichita, KS (US); Merril Binford Williams, Wichita, KS (US); Jonathan Lynn Headrick, Wichita, KS (US); Michael John Seibel, Wichita, KS (US)

(73) Assignee: Textron Innovations Inc., Wichita, KS (US)

( * ) Notice: Subject to any disclaimer, the term of this patent is extended or adjusted under 35 U.S.C. 154(b) by 135 days.

(21) Appl. No.: 17/736,712

(22) Filed: May 4, 2022

(65) Prior Publication Data

US 2022/0363396 A1    Nov. 17, 2022

Related U.S. Application Data

(63) Continuation-in-part of application No. 29/783,124, filed on May 11, 2021, now Pat. No. Des. 993,146.

(60) Provisional application No. 63/187,082, filed on May 11, 2021.

(51) Int. Cl.
*B64D 11/06* (2006.01)

(52) U.S. Cl.
CPC ................ *B64D 11/0644* (2014.12)

(58) Field of Classification Search
CPC .............. B64D 11/0644; A47C 1/03
See application file for complete search history.

(56) References Cited

U.S. PATENT DOCUMENTS

| | | | |
|---|---|---|---|
| 3,489,458 A | * | 1/1970 | Asbjorn ............. B64D 11/0644 297/411.45 |
| D294,136 S | | 2/1988 | Eide |
| D373,344 S | | 9/1996 | Wissen, Jr. |
| D419,519 S | | 1/2000 | Whidbee |
| 6,264,273 B1 | | 7/2001 | Waters, Sr. |
| D502,910 S | | 3/2005 | Klopp, III et al. |
| 9,044,093 B1 | * | 6/2015 | Pan ......................... A47C 1/03 |
| D758,952 S | | 6/2016 | Erhel |
| 10,850,850 B2 | | 12/2020 | Murnan et al. |

(Continued)

FOREIGN PATENT DOCUMENTS

JP    D200418393    3/2005

OTHER PUBLICATIONS

Notice of Allowance, dated Mar. 16, 2023, 5 pages, issued in U.S. Appl. No. 29/783, 124.

*Primary Examiner* — Tye William Abell
(74) *Attorney, Agent, or Firm* — Avek IP, LLC

(57) ABSTRACT

A cockpit center console armrest includes a base member configured for mounting to a floor, an extending member mechanically coupled to the base member, and an armrest mechanically coupled to the extending member. The extending member includes an inner telescoping member configured for sliding within an outer telescoping member for adjusting a height of the armrest. A lever exposed on an underside of the armrest is configured for actuating a release mechanism. The release mechanism is configured for releasably securing the inner telescoping member to the outer telescoping member. A pivot axis pivotably couples the extending member to the base member such that the extending member is rotatable for rotating the armrest between a deployed orientation and a retracted orientation.

20 Claims, 20 Drawing Sheets

(56) References Cited

U.S. PATENT DOCUMENTS

| | | |
|---|---|---|
| 2015/0203047 A1 | 7/2015 | Middel |
| 2018/0304790 A1 | 10/2018 | Patil et al. |
| 2019/0092195 A1* | 3/2019 | Davis ................. B64D 11/0644 |
| 2019/0351799 A1* | 11/2019 | Kim ........................ A47C 7/541 |
| 2020/0114785 A1 | 4/2020 | Hagedorn et al. |
| 2022/0089287 A1* | 3/2022 | Hoover .............. B64D 11/0644 |
| 2022/0169161 A1 | 6/2022 | Mergl et al. |
| 2022/0363396 A1 | 11/2022 | Rowe et al. |
| 2023/0061160 A1* | 3/2023 | Hoover .................... B60N 2/77 |

* cited by examiner

COCKPIT CENTER CONSOLE ARMREST

CROSS-REFERENCE TO RELATED APPLICATIONS

This application claims the benefit of U.S. Provisional Application No. 63/187,082 entitled "Cockpit Center Console Armrest" and filed on May 11, 2021 and is a continuation-in-part of U.S. Design patent application 29/783,124, entitled "Cockpit Center Console Armrest" filed May 11, 2021, the disclosures of which are herein incorporated in their entirety.

BACKGROUND

1. Field of the Disclosure

Embodiments of this disclosure relate generally to the field of vehicle seating. More specifically, embodiments of this disclosure include a free-standing center console having a retractable armrest for use in an aircraft cockpit.

2. Description of the Related Art

Many different types of armrests for use with aircraft pilot or copilot seats have been described in the prior art. For example, U.S. Patent Application Publication No. 2019/0351799 to Kim et al. discloses an armrest for a pilot that is adjustable in height and the angle. U.S. Pat. No. 9,044,093 to Pan discloses a height-adjustable handrest. U.S. Pat. No. 10,850,850 to Murnan et al. discloses three armrest assemblies that are each pivotable. U.S. Pat. No. 6,264,273 to Waters, Sr. discloses a multiple unit assembly designed to address the problem of fatigue faced by pilots of small aircraft that are not equipped with a center armrest.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

In some aspects, the techniques described herein relate to a center console armrest, including: a base member configured for mounting to a floor; an extending member mechanically coupled to the base member; an armrest mechanically coupled to the extending member; wherein the extending member includes an inner telescoping member configured for sliding within an outer telescoping member for adjusting a height of the armrest; a lever exposed on an underside of the armrest, the lever being configured for actuating a release mechanism configured for releasably securing the inner telescoping member to the outer telescoping member; and a pivot axis pivotably coupling the extending member to the base member such that the extending member is rotatable for rotating the armrest between a deployed orientation and a retracted orientation.

In some aspects, the techniques described herein relate to a method for adjusting a position of a center console armrest, the armrest including a base member configured for mounting to a floor, an extending member mechanically coupled to the base member, an armrest mechanically coupled to the extending member, and a pivot axis pivotably coupling the extending member to the base member, the method including: actuating a release mechanism via a release lever disposed on an underside of the armrest, wherein the extending member includes an inner telescoping member and an outer telescoping member, and the release mechanism releases the inner telescoping member for sliding within the outer telescoping member; adjusting a height of the armrest by raising or lowering the inner telescoping member with respect to the outer telescoping member when the release mechanism is actuated; and rotating the armrest between a deployed orientation and a stowed orientation via the pivot axis.

In some aspects, the techniques described herein relate to a cockpit center console armrest, including: a base member configured for mounting to a floor of an aircraft cockpit; an extending member mechanically coupled to the base member; an armrest mechanically coupled to the extending member; wherein the extending member includes an inner telescoping member slidably coupled within an outer telescoping member, such that the inner telescoping member slides in a longitudinal direction within the outer telescoping member for adjusting a height of the armrest; a pivot axis pivotably coupling the outer telescoping member to the base member such that the extending member is rotatable for rotating the armrest between a deployed orientation and a retracted orientation; a lever disposed on an underside of the armrest; a connecting member having a first end and a second end, wherein the first end is operatively coupled to the lever; a release mechanism mechanically coupled to the second end of the connecting member, wherein the release mechanism includes a groove and a ball configured for moving along the groove; and a plurality of holes aligned longitudinally in the outer telescoping member, wherein the ball is configured for partially inserting into one hole of the plurality of holes for securing a height of the armrest, wherein actuation of the lever raises the release mechanism via the connecting member such that the ball moves within the groove to retract the ball bearing from the one hole thereby releasing the armrest for adjusting a height of the armrest.

BRIEF DESCRIPTION OF THE DRAWINGS

Illustrative embodiments of the present disclosure are described in detail below with reference to the attached drawing figures, which are incorporated by reference herein and wherein.

Figure 1:
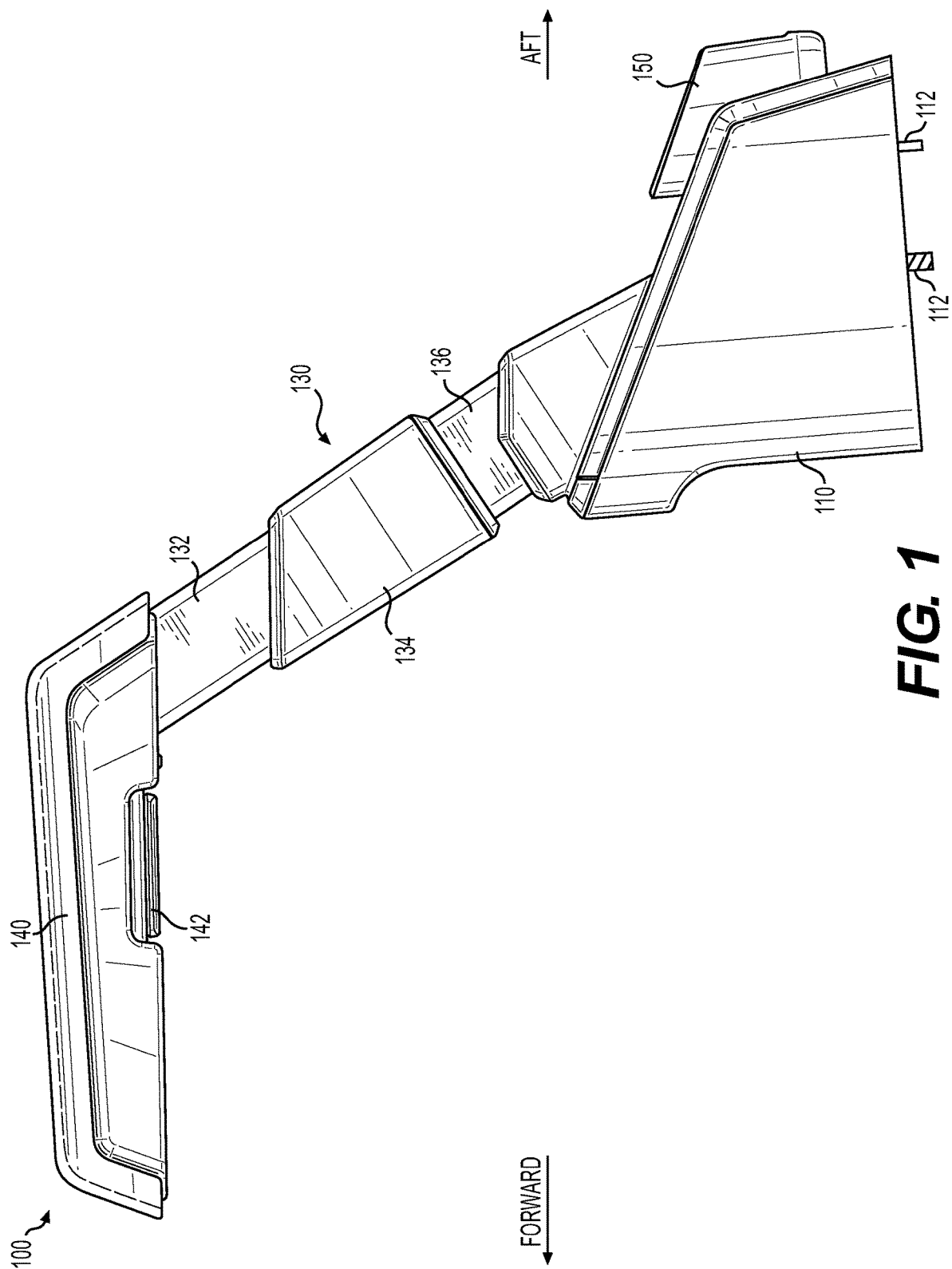
FIG. 1 shows a side view of a cockpit center console armrest, in an embodiment.

The drawing figures do not limit the invention to the specific embodiments disclosed and described herein. The drawings are not necessarily to scale, emphasis instead being placed upon clearly illustrating the principles of the disclosure.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

FIG. 1 shows a side view of an exemplary cockpit center console armrest 100. The cockpit center console armrest 100 is configured to be a free-standing armrest mounted to a floor and located adjacent at least one seat. A forward direction and an aft direction are depicted in FIG. 1 for illustrating an orientation of cockpit center console armrest 100 during its primary intended use in an aircraft cockpit, as shown in FIGS. 8-13.

Figure 2:
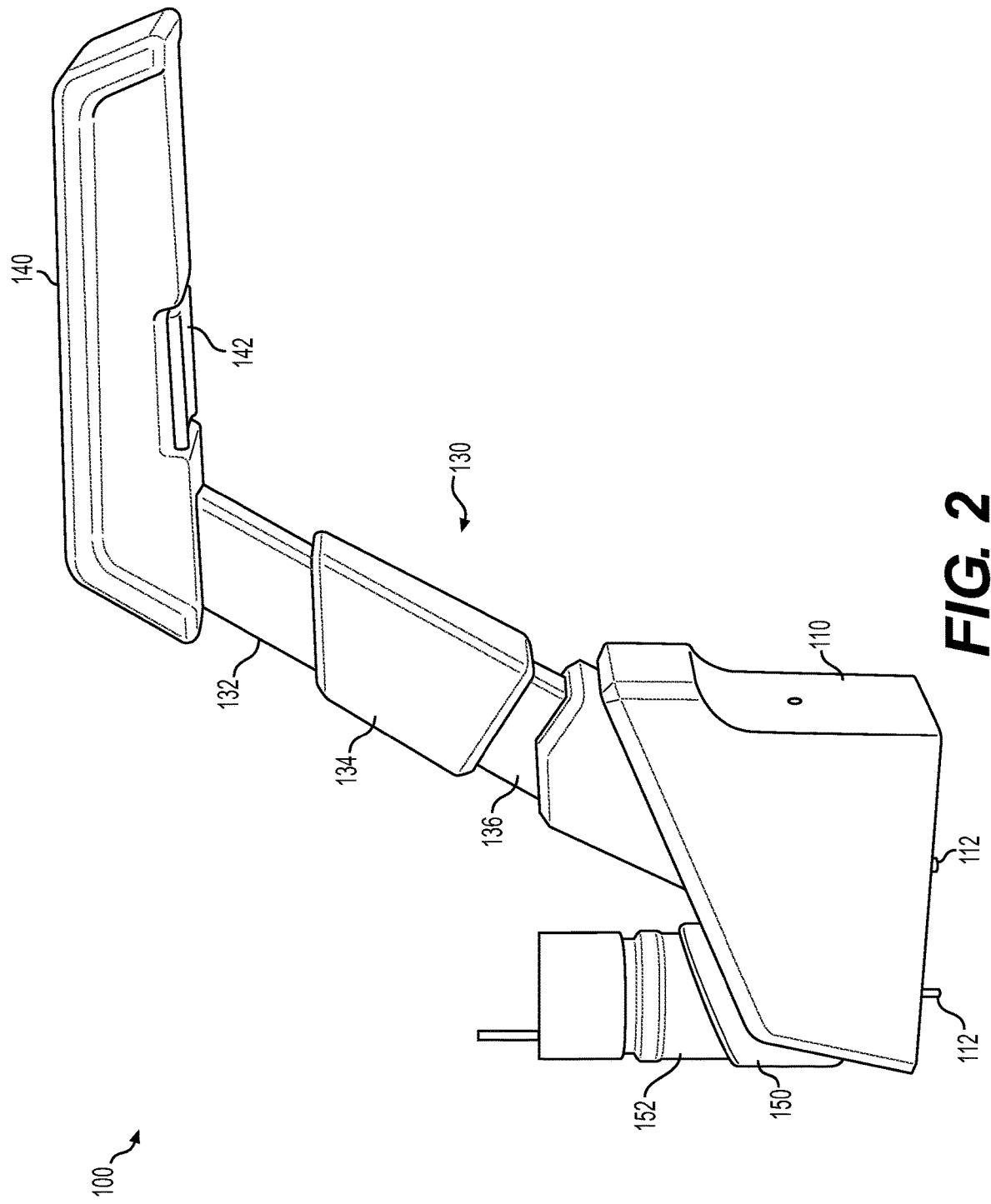
FIG. 2 shows a perspective view of the cockpit center console armrest of FIG. 1.
Figure 3:
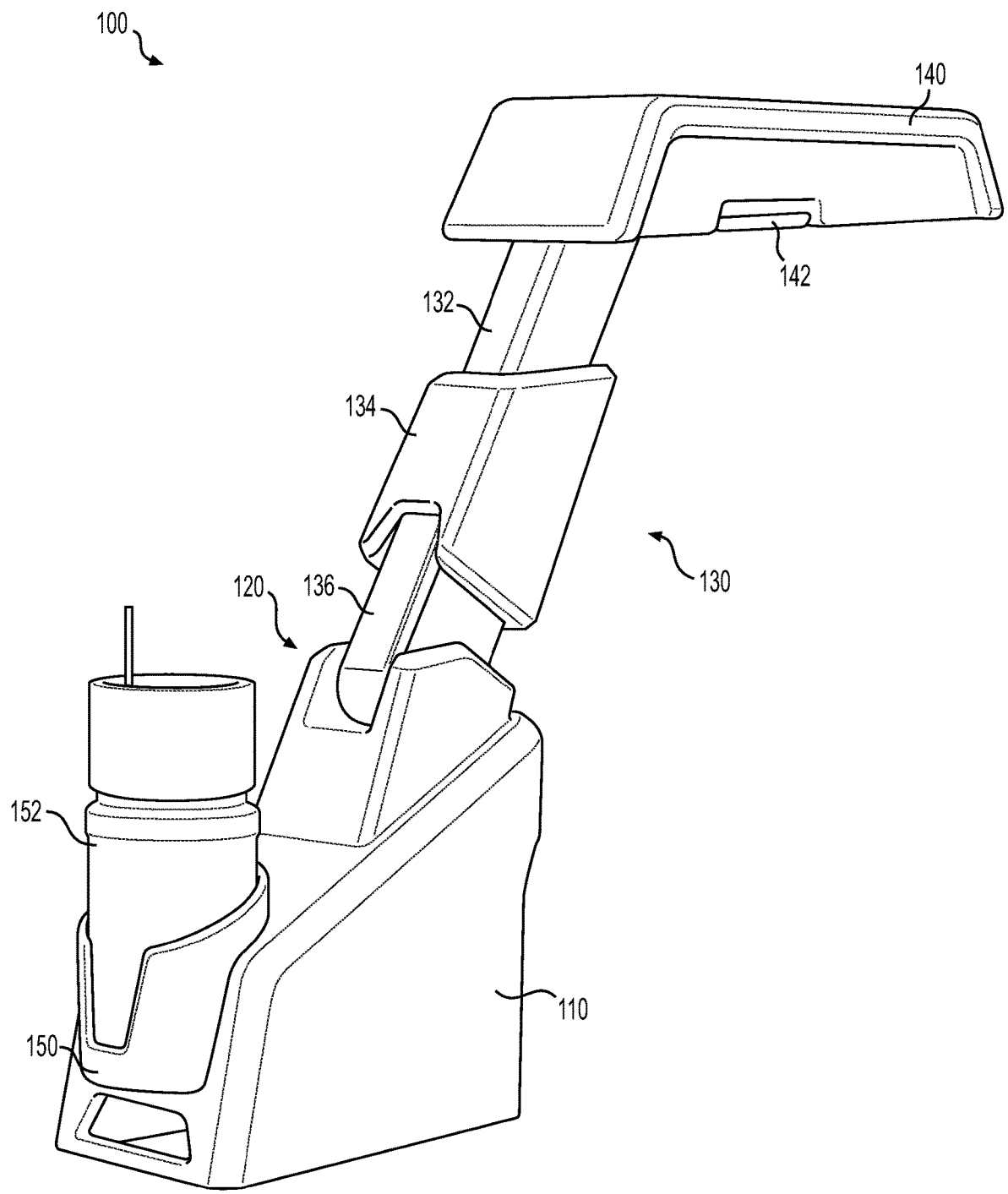
FIG. 3 shows a rear perspective view of the cockpit center console armrest of FIG. 1.
Figure 4:
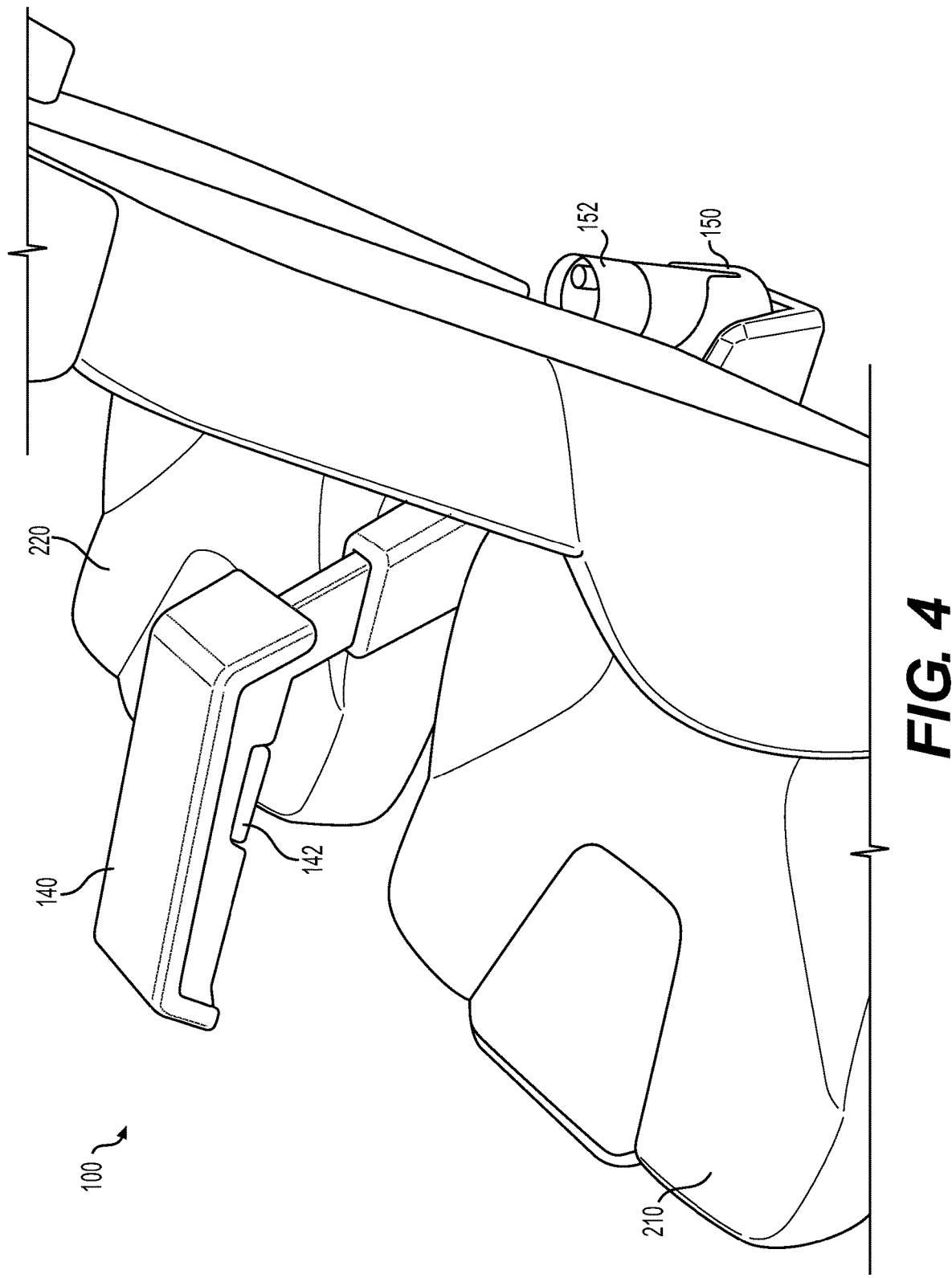
FIG. 4 shows a perspective view of the cockpit center console armrest of FIG. 1 in a deployed orientation between a pilot seat and a co-pilot seat.

FIG. 2 shows a perspective view of cockpit center console armrest 100. FIG. 3 shows a rear perspective view of cockpit center console armrest 100. FIG. 4 shows a perspective view of cockpit center console armrest 100 between a pilot seat 210 and a co-pilot seat 220. FIGS. 1-4 are best viewed together with the following description.

As depicted in FIGS. 1-4, cockpit center console armrest 100 includes an armrest 140 positioned in a deployed orientation for use as an armrest adjacent a seat. For example, as depicted in FIG. 4, cockpit center console armrest 100 is deployed between pilot seat 210 and co-pilot seat 220. As best viewed in FIGS. 1-3, armrest 140 is mechanically coupled with a base member 110 via an extending member 130. Base member 110 is configured for mounting to a floor 250 of the aircraft (see FIGS. 11-13). For example, base member may include one or more bolts or fasteners for securing to floor 250. As depicted in FIG. 1, a plurality of bolts 112 extend beneath base member 110 for screwing into a threaded receptacle in floor 250 (not shown). Other fastening means may be employed for securing base member 110 to floor 250 without departing from the scope hereof.

Extending member 130 includes an inner telescoping member 132 and an outer telescoping member 136. Inner telescoping member 132 is slidably coupled to outer telescoping member 136 enabling inner telescoping member 132 to slide in a longitudinal direction within outer telescoping member 136 for adjusting a length of extending member 130, thereby adjusting a height of armrest 140. An enclosure 134 is disposed around an upper portion of outer telescoping member 136 for hiding a portion of outer telescoping member 136, as further described below in connection with FIG. 16. Inner telescoping member 132 is configured to move upwardly and downwardly, while outer telescoping member 136 is pivotally coupled to base member 110 as further described below.

A lever 142 is located on an underside of the armrest 140. Lever 142 enables a user to actuate a vertical adjustment mechanism for raising and lowering a height of armrest 140 via inner telescoping member 132 and outer telescoping member 136. Lever 142 extends to opposing sides of armrest 140, as best viewed in FIG. 14, such that the user may access lever 142 from either side of armrest 140. This facilitates height adjustment of armrest 140 by either the pilot or the co-pilot. Functioning of lever 142 and the vertical adjustment mechanism are further described below in connection with FIGS. 15-19.

Figure 5:
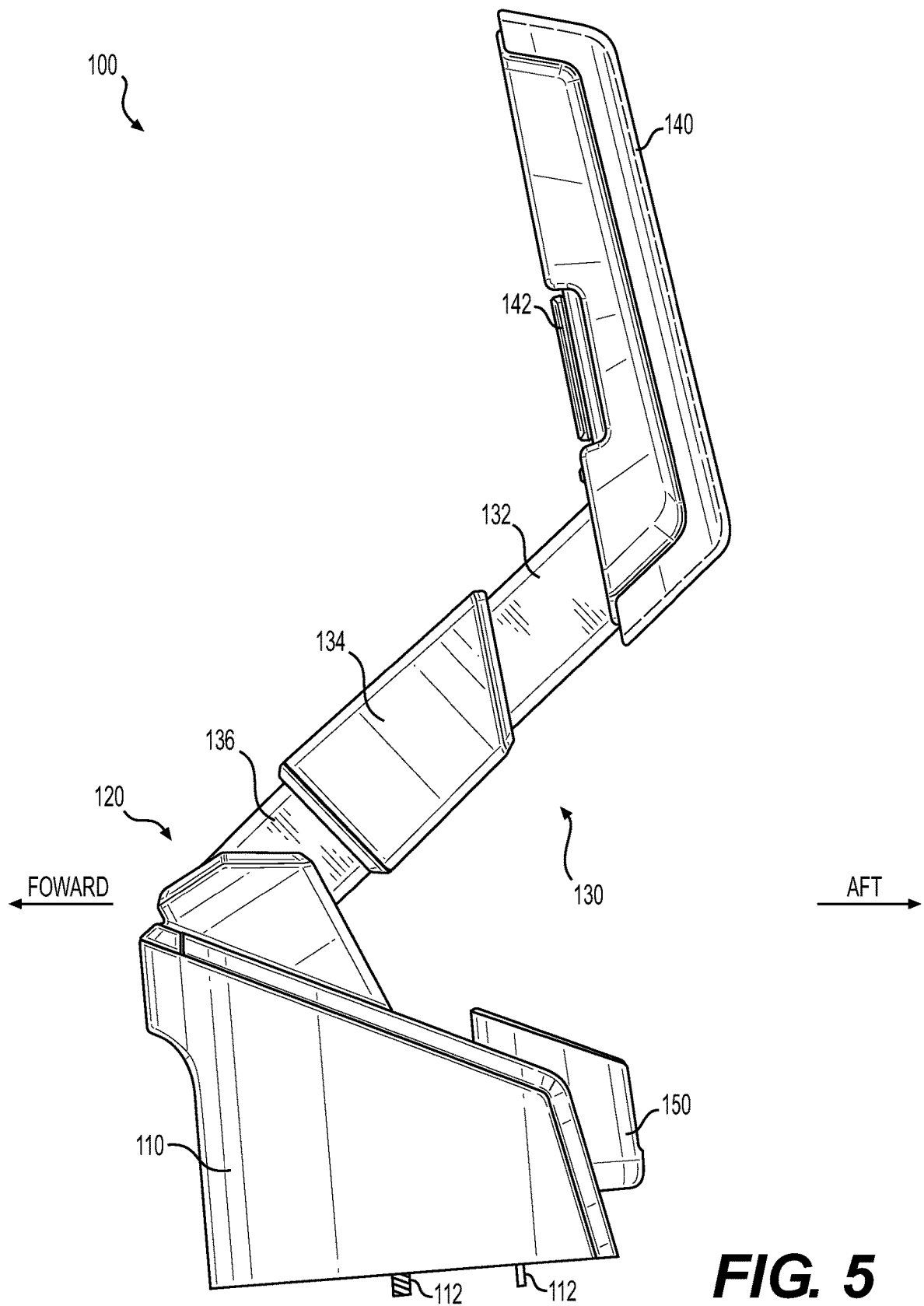
FIG. 5 shows a side view of the cockpit center console armrest of FIG. 1 in a retracted orientation.
Figure 6:
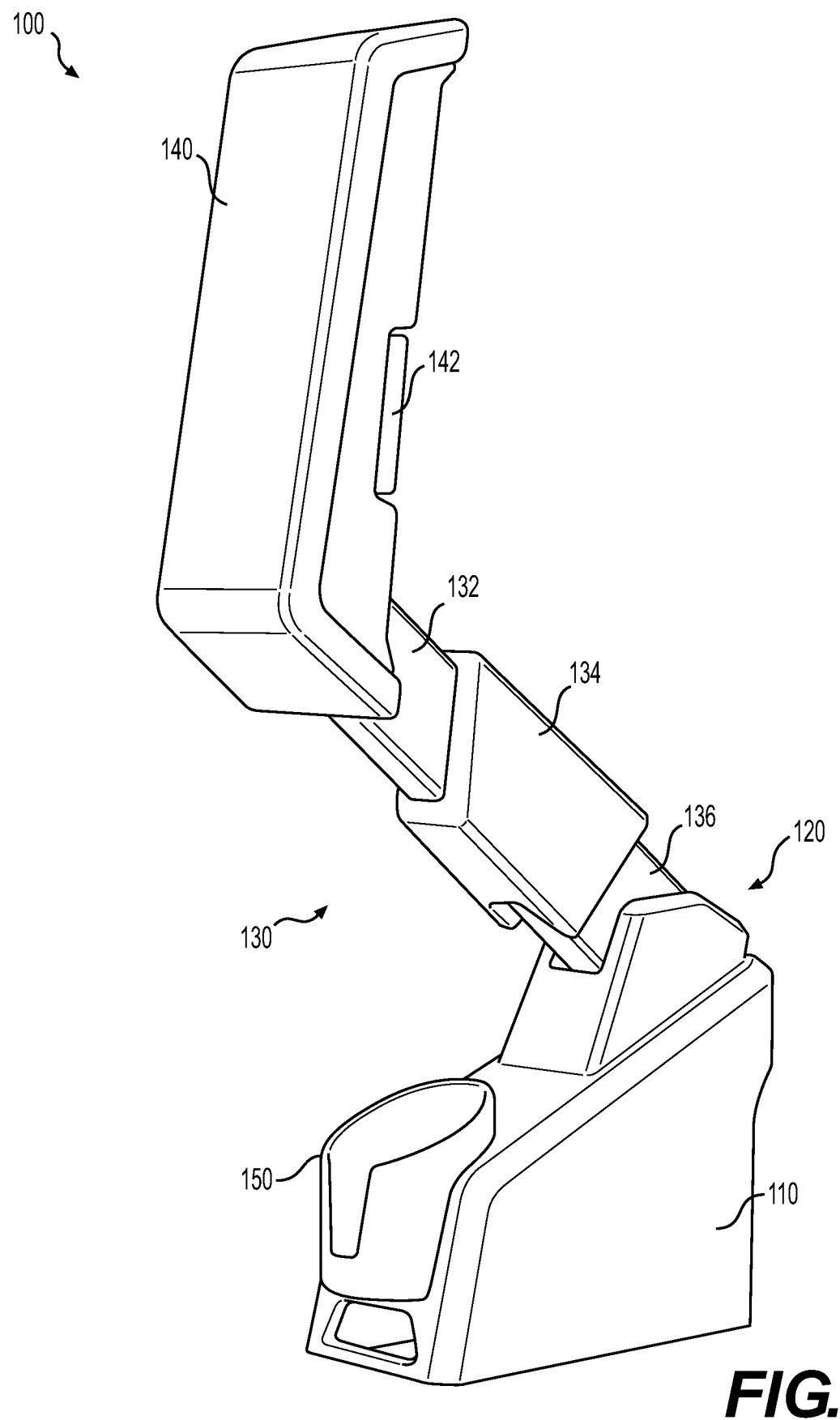
FIG. 6 shows a rear perspective view of the cockpit center console armrest of FIG. 1 in the retracted orientation.
Figure 7:
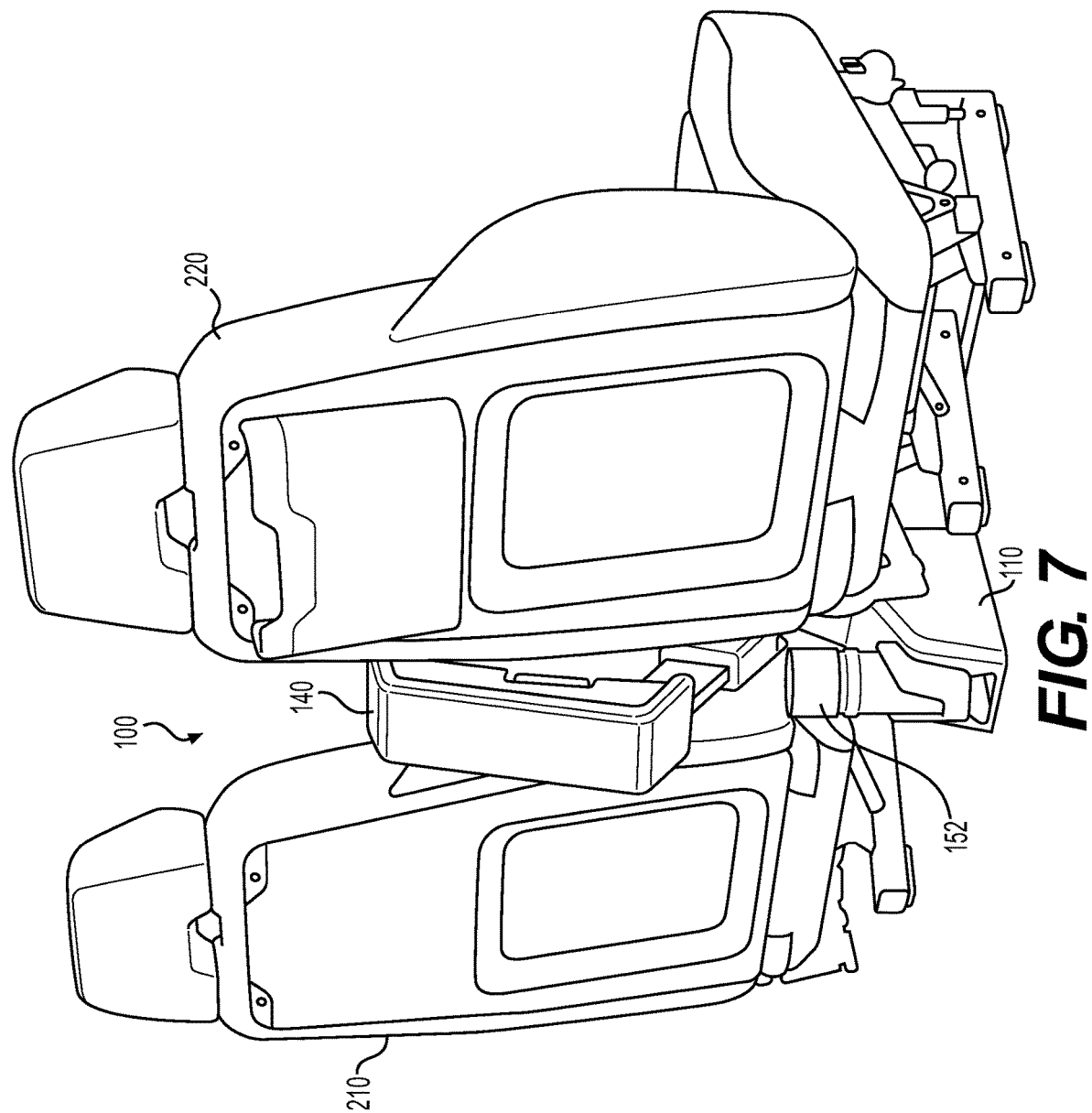
FIG. 7 shows a rear perspective view of the cockpit center console armrest of FIG. 1 in the retracted orientation between the pilot seat and the co-pilot seat.

As depicted in FIG. 3, a first end 120 of outer telescoping member 136 is pivotally coupled with base member 110, which enables extending member 130 and armrest 140 to be pivoted from the deployed orientation shown in FIGS. 1-4 to a retracted orientation, as shown in FIGS. 5-7. The pivoting mechanism is further described below in connection with FIG. 16.

Base member 110 includes a fuel sample container holder 150. In embodiments, fuel sample container holder 150 is mounted within base member 110. As depicted in FIGS. 2-4, fuel sample container holder 150 is configured for holding a fuel sample container 152. Fuel sample container 152 is a jar configured for storing a fuel sample, such as a 12-oz. GATs Fuel Sampler cup, for example. Fuel sample container holder 150 may be lined with liner made of a grippy material, such as a rubber sleeve. The liner and the shape of fuel sample container holder 150 are configured to provide a snug fit for holding fuel sample container 152 during routine aircraft maneuvers. Alternatively, fuel sample container holder 150 may be configured as a cup holder.

FIG. 5 shows a side view of cockpit center console armrest 100 in the retracted orientation. FIG. 6 shows a rear perspective view of cockpit center console armrest 100 in the retracted orientation. FIG. 7 shows a rear perspective view of cockpit center console armrest 100 in the retracted orientation between pilot seat 210 and co-pilot seat 220. FIGS. 5-7 are best viewed together with the following description.

As depicted in FIGS. 5-7, extending member 130 has been pivoted about its first end 120 with respect to base member 110, thereby displacing armrest 140 into the retracted orientation. In embodiments, the retracted orientation of armrest 140 provides a stowed position (e.g., an "aft-stowed position") for stowing armrest 140 when not in use. As best viewed in FIG. 7, armrest 140 is aligned between the seat backs of pilot seat 210 and co-pilot seat 220 in an aft-stowed position, rather than being deployed adjacent the bases of seats 210, 220 as shown in FIG. 4. The pilot or co-pilot may wish to rotate armrest 140 into the aft-stowed position when armrest 140 is not in use or to make room for the co-pilot to climb into co-pilot seat 220 via pilot seat 210.

Figure 8:
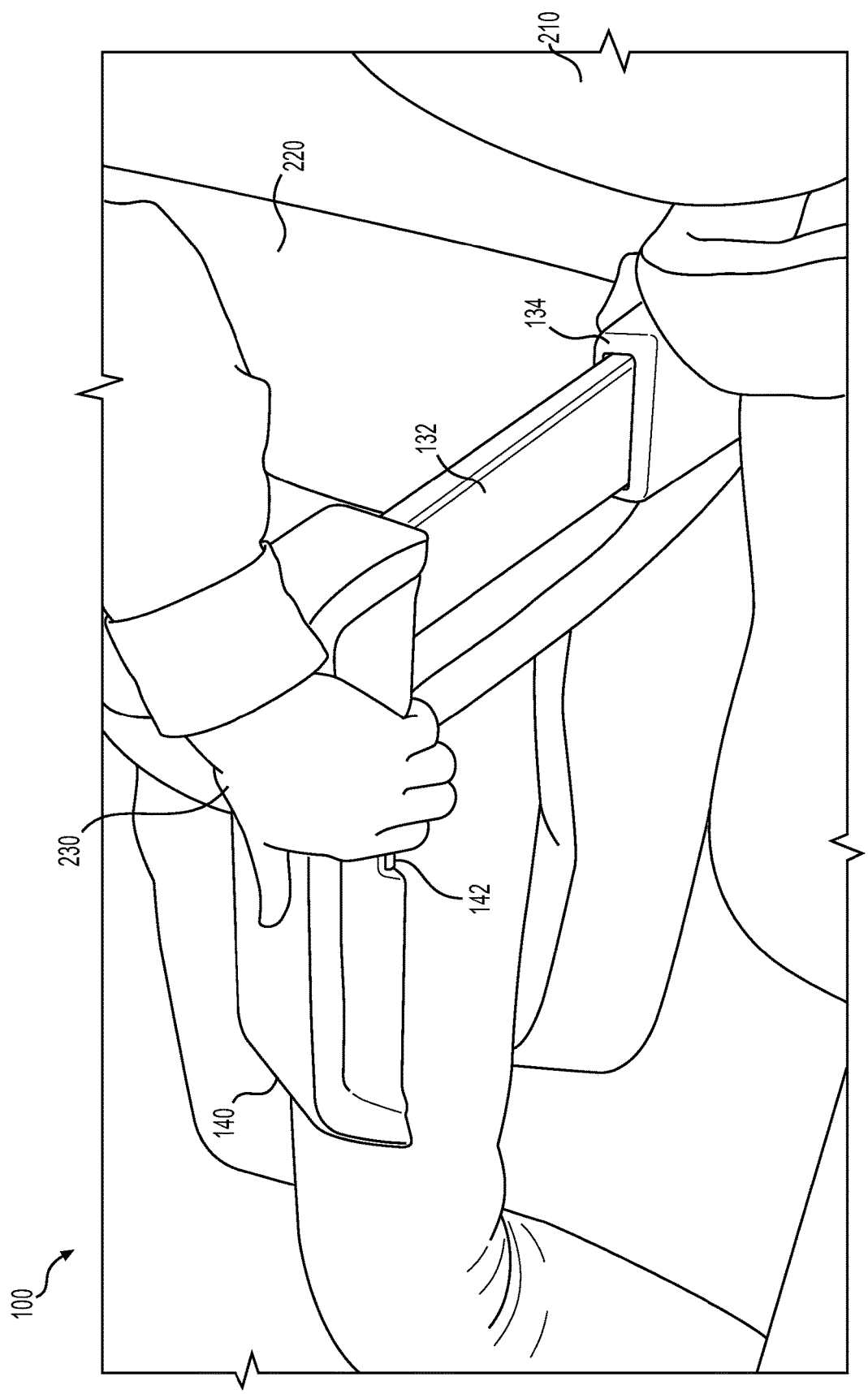
FIG. 8 shows a side view of the cockpit center console armrest of FIG. 1 in the deployed orientation with a user activating an actuation lever.

FIG. 8 shows a side view of cockpit center console armrest 100 in the deployed orientation with a user actuating lever 142 via a hand 230. Actuation of lever 142 enables raising and lowering of armrest 140 via inner telescoping member 132 sliding in and out of outer telescoping member 136, as further described below in connection with FIGS. 14-19.

Figure 9:
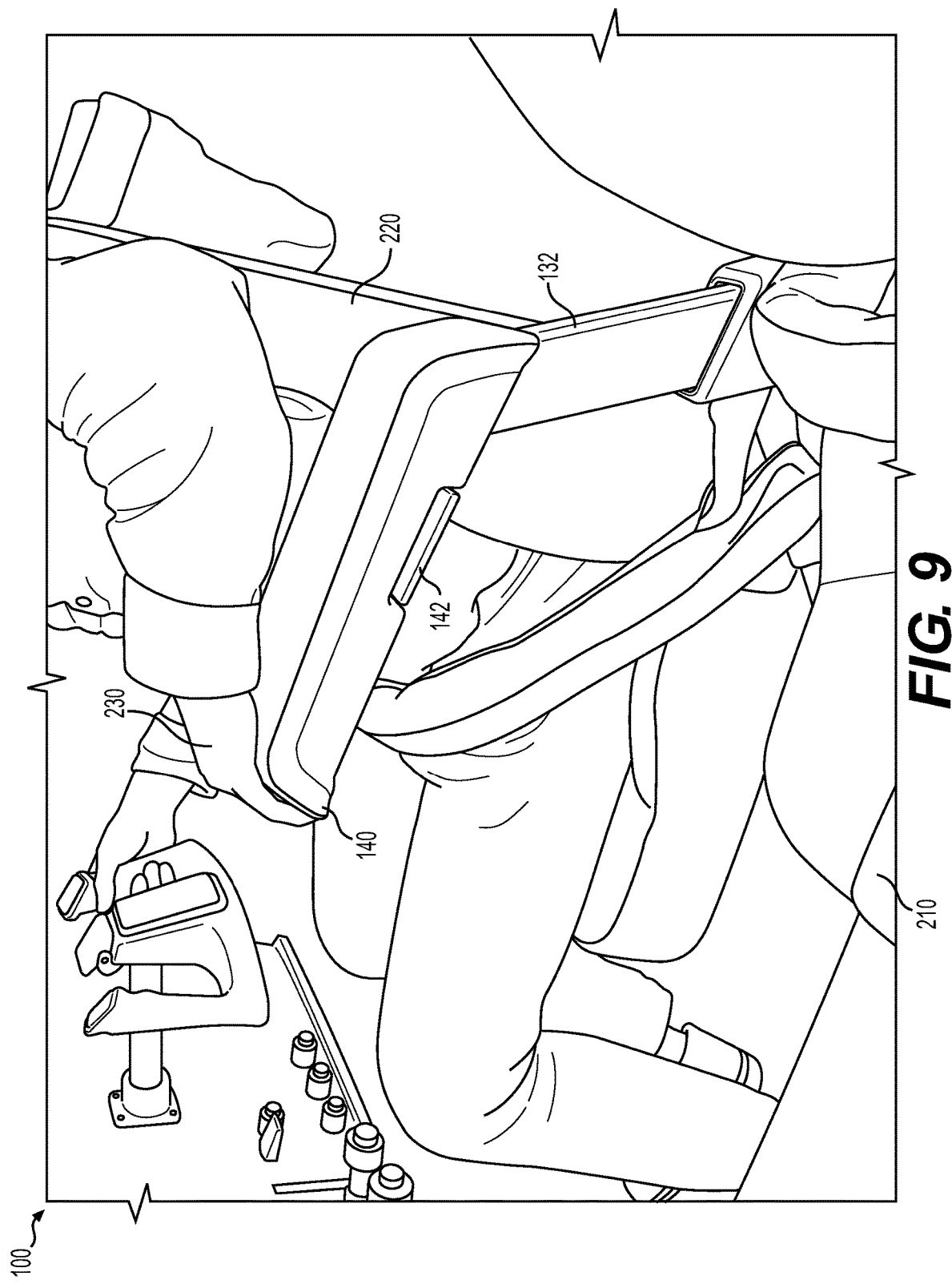
FIG. 9 shows a side view of the cockpit center console armrest of FIG. 1 as it is being moved from the deployed orientation to the retracted orientation by the user.

FIG. 9 shows a side view of cockpit center console armrest 100 as it is being rotated from the deployed orientation to the retracted orientation by the hand 230 of the user. The user may lift upwardly on the free end of armrest 140 to pivot armrest 140 and extending member 130 from the deployed orientation into the retracted orientation. In embodiments, the extending member 130 is not locked in either orientation such that no locking mechanism is needed to move the armrest. Instead, detents are provided to keep armrest 140 snuggly secured in either the deployed or retracted orientations. The detents are further described below in connection with FIGS. 16 and 18.

Figure 10:
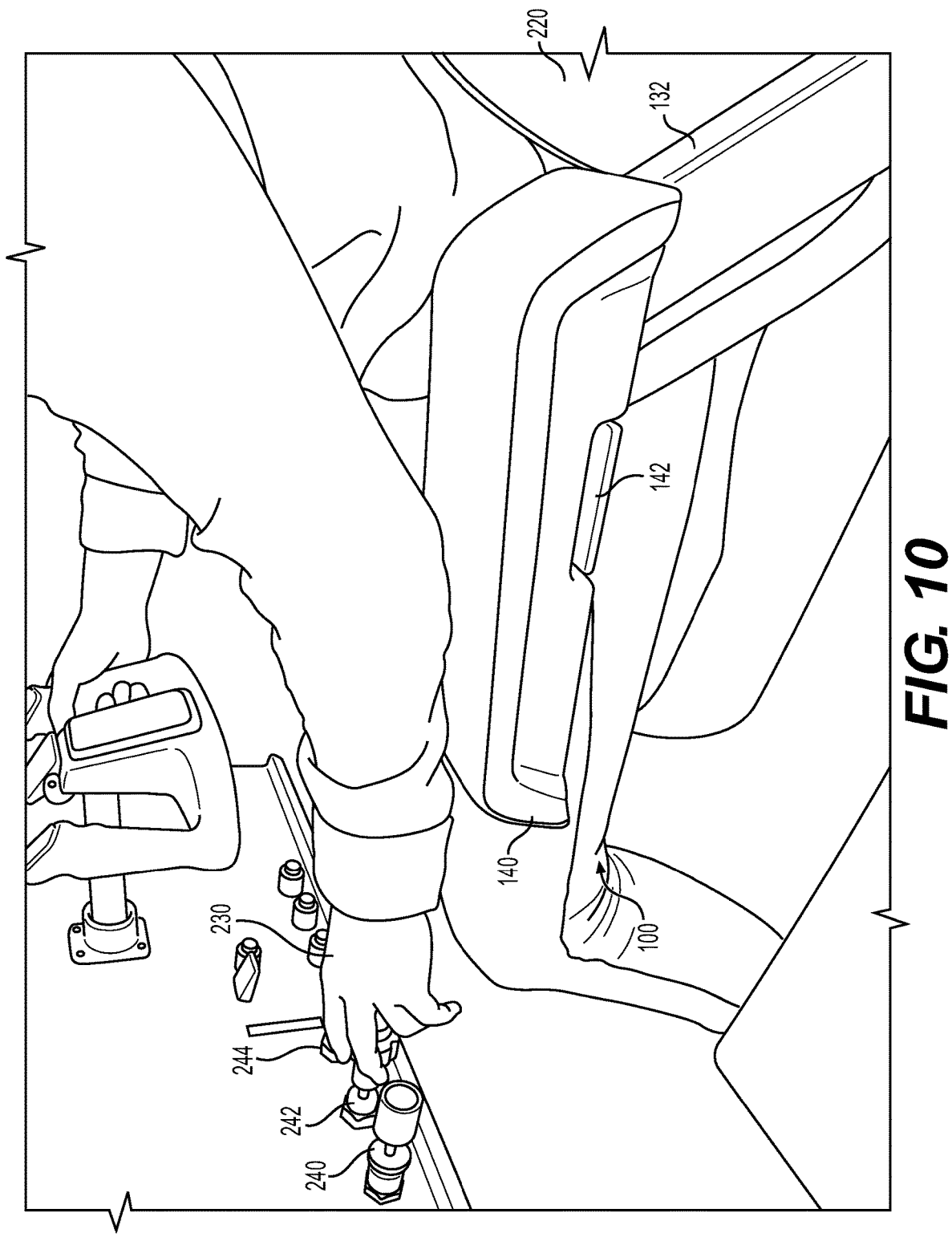
FIG. 10 shows a side view of the cockpit center console armrest of FIG. 1 in use as the user is adjusting controls on a control panel.

FIG. 10 shows a side view of the cockpit center console armrest of FIG. 1 in use as the user is adjusting controls on a control panel. Armrest 140 is configured for a user to rest his or her arm while the hand 230 of the user is able to reach control levers 240, 242, 244. Control levers 240, 242, 244 may include, for example, a throttle control lever, a mixture control lever, and a propeller control lever.

Figure 11:
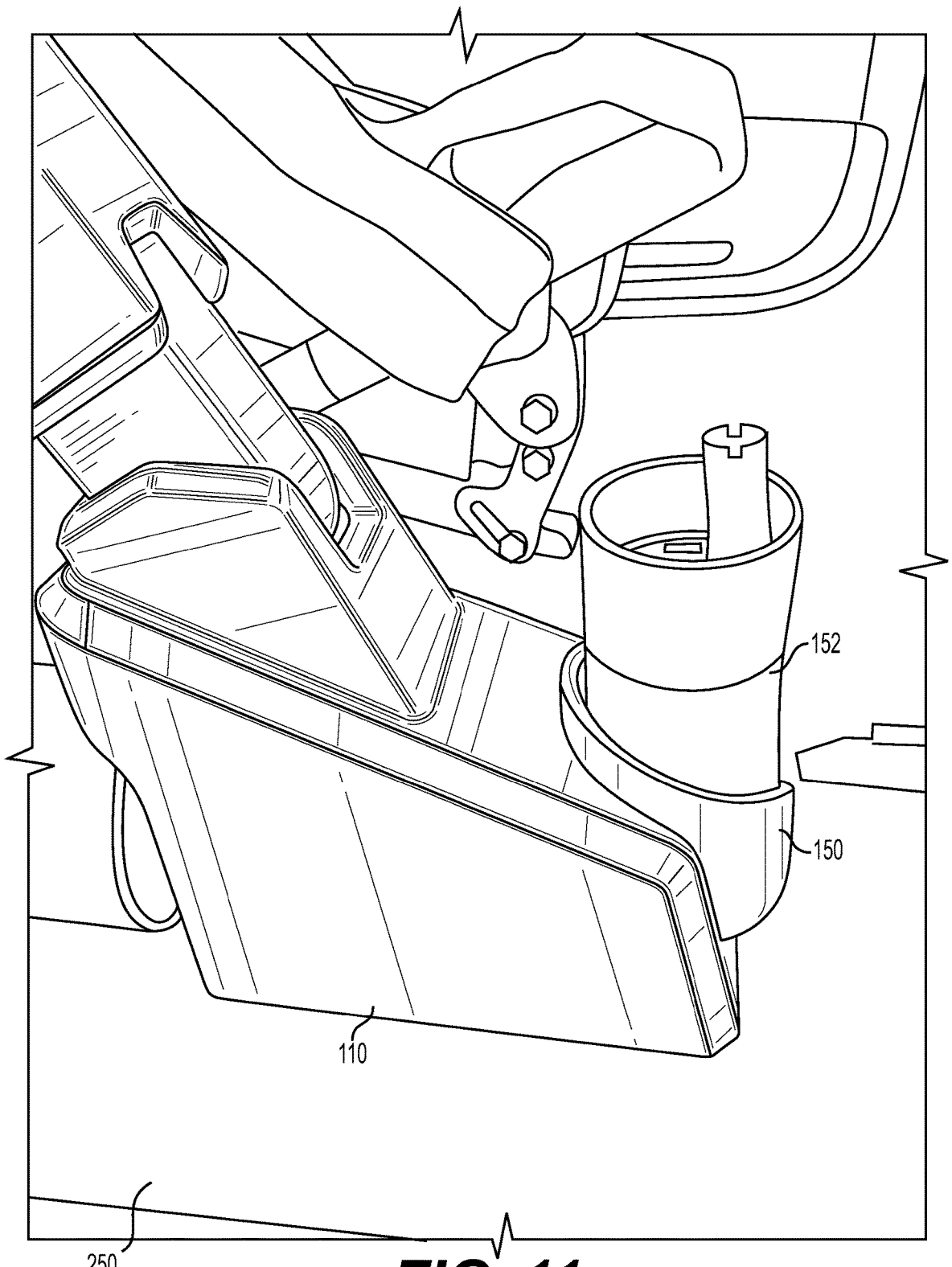
FIG. 11 shows a side view of the cockpit center console armrest of FIG. 1 holding a fuel sample container.

FIG. 11 shows a side view of the cockpit center console of FIG. 1 holding fuel sample container 152.

Figure 12:
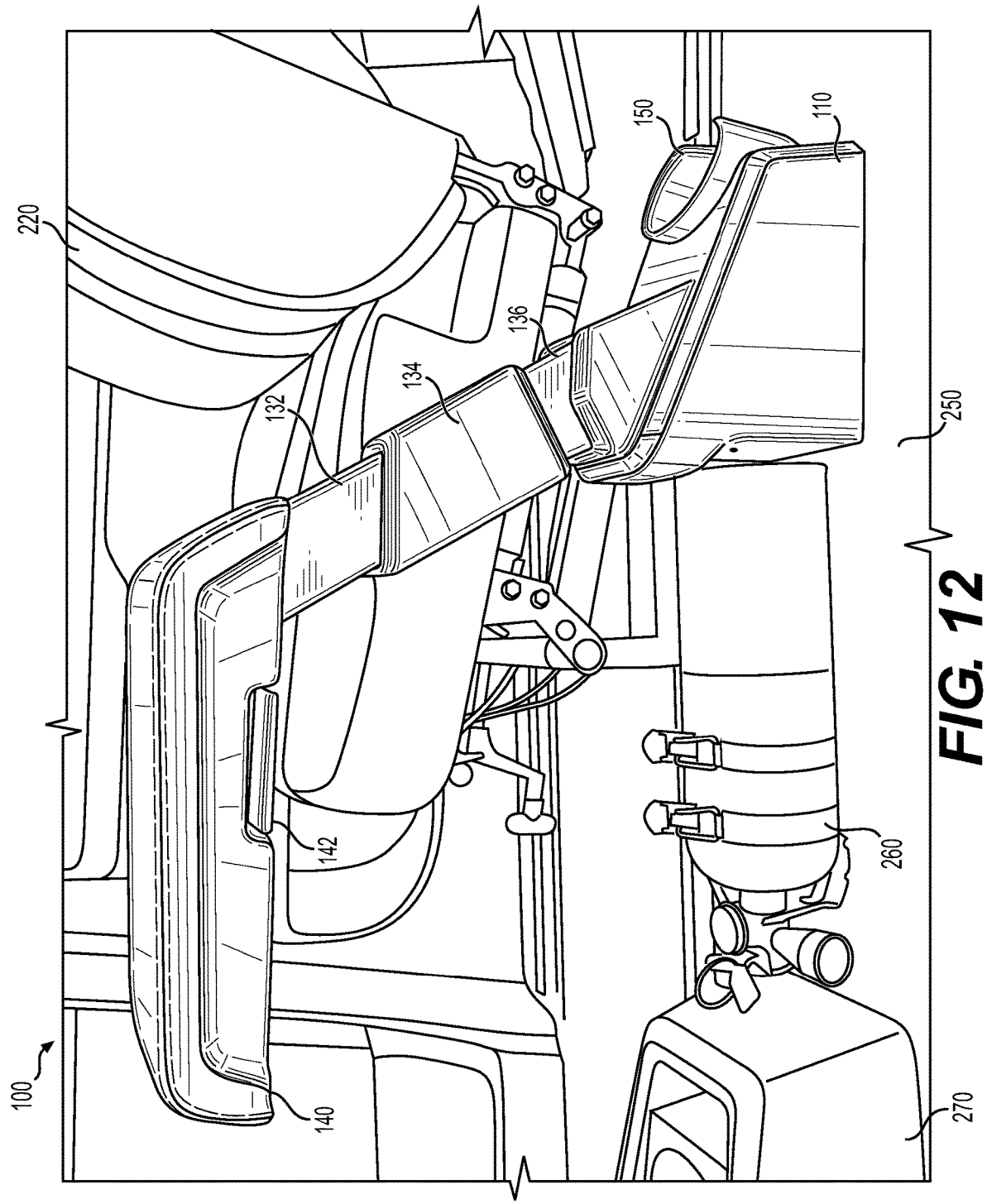
FIG. 12 shows a side view of the cockpit center console armrest of FIG. 1 adjacent a fire extinguisher.

FIG. 12 shows a side view of the cockpit center console of FIG. 1 adjacent a fire extinguisher 260 mounted to floor 250. Armrest 140 may be rotated to the aft-stowed position to facilitate access to items on floor 250 such as fire extinguisher 260.

Figure 13:
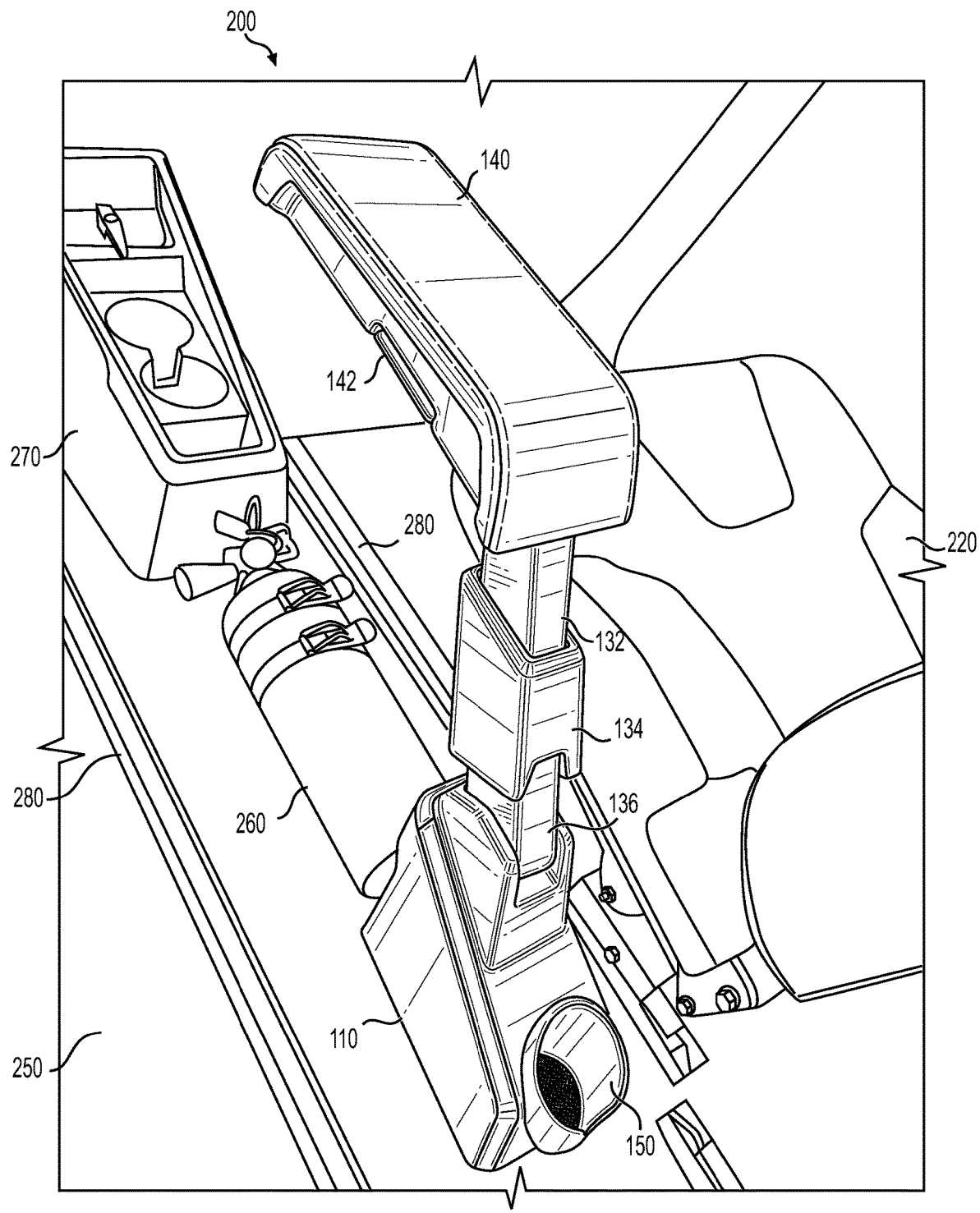
FIG. 13 shows a perspective view of the cockpit center console armrest of FIG. 1 adjacent the fire extinguisher.

FIG. 13 shows a perspective view of the cockpit center console of FIG. 1 adjacent fire extinguisher 260. A console 270 remains accessible to the pilot and co-pilot when armrest 140 is in the deployed orientation. Base member 110 is mounted to floor 250 between seat tracks 280 without interfering with seat tracks 280.

Figure 14:
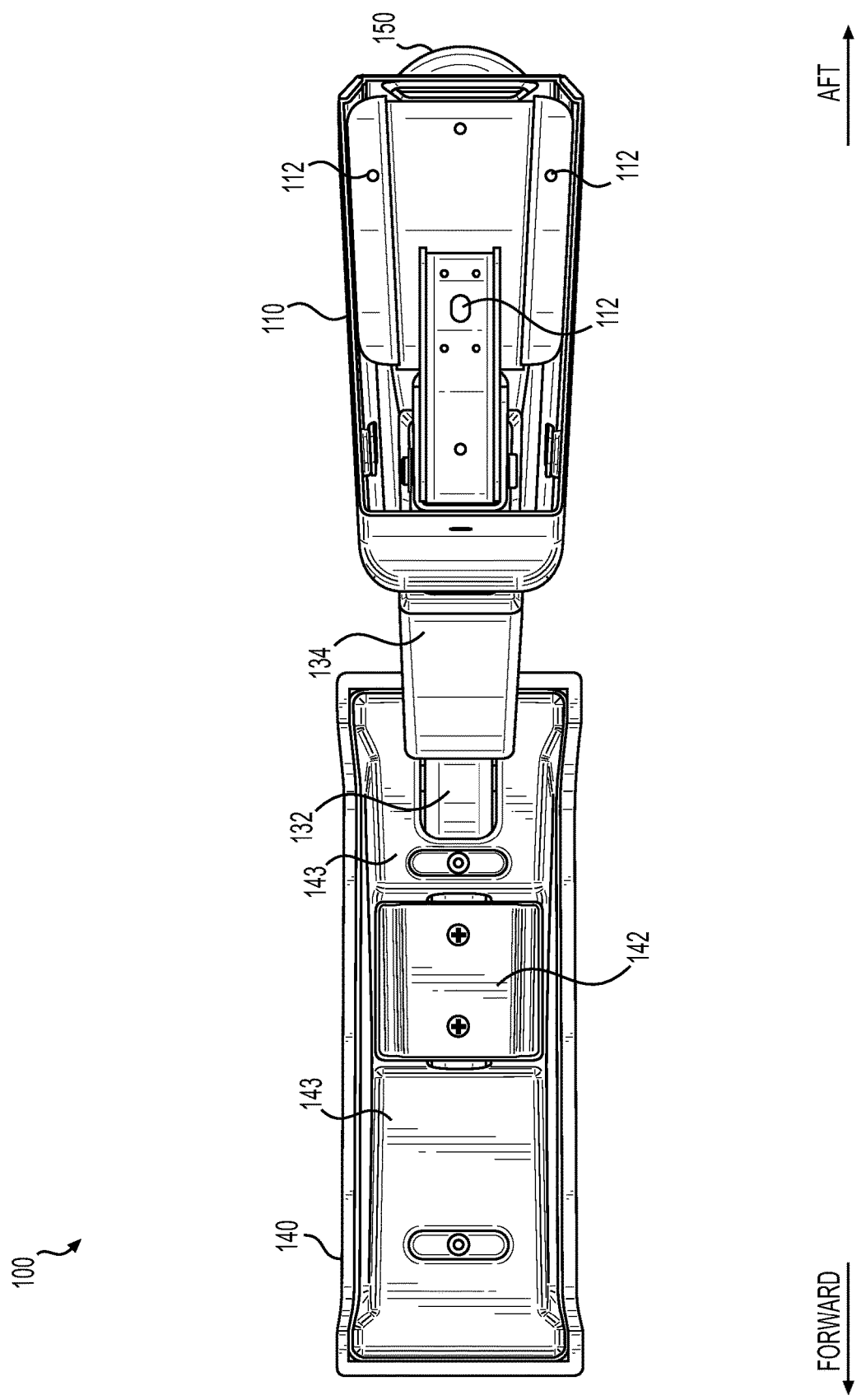
FIG. 14 shows a bottom view of the cockpit center console armrest of FIG. 1.

FIG. 14 shows a bottom view of cockpit center console armrest 100. A cover 143 hides the underlying components of armrest 140 while leaving lever 142 exposed and accessible for actuation by a user. Cover 143 may be fastened via fasteners. In embodiments, cover 143 is mounted to brackets via bolts, in which the brackets are mechanically coupled to an underside of armrest 140 (e.g., see FIGS. 15-17). As depicted in FIG. 14, three bolts 112 are provided for mounting base member 110 to floor 250.

Figure 15:
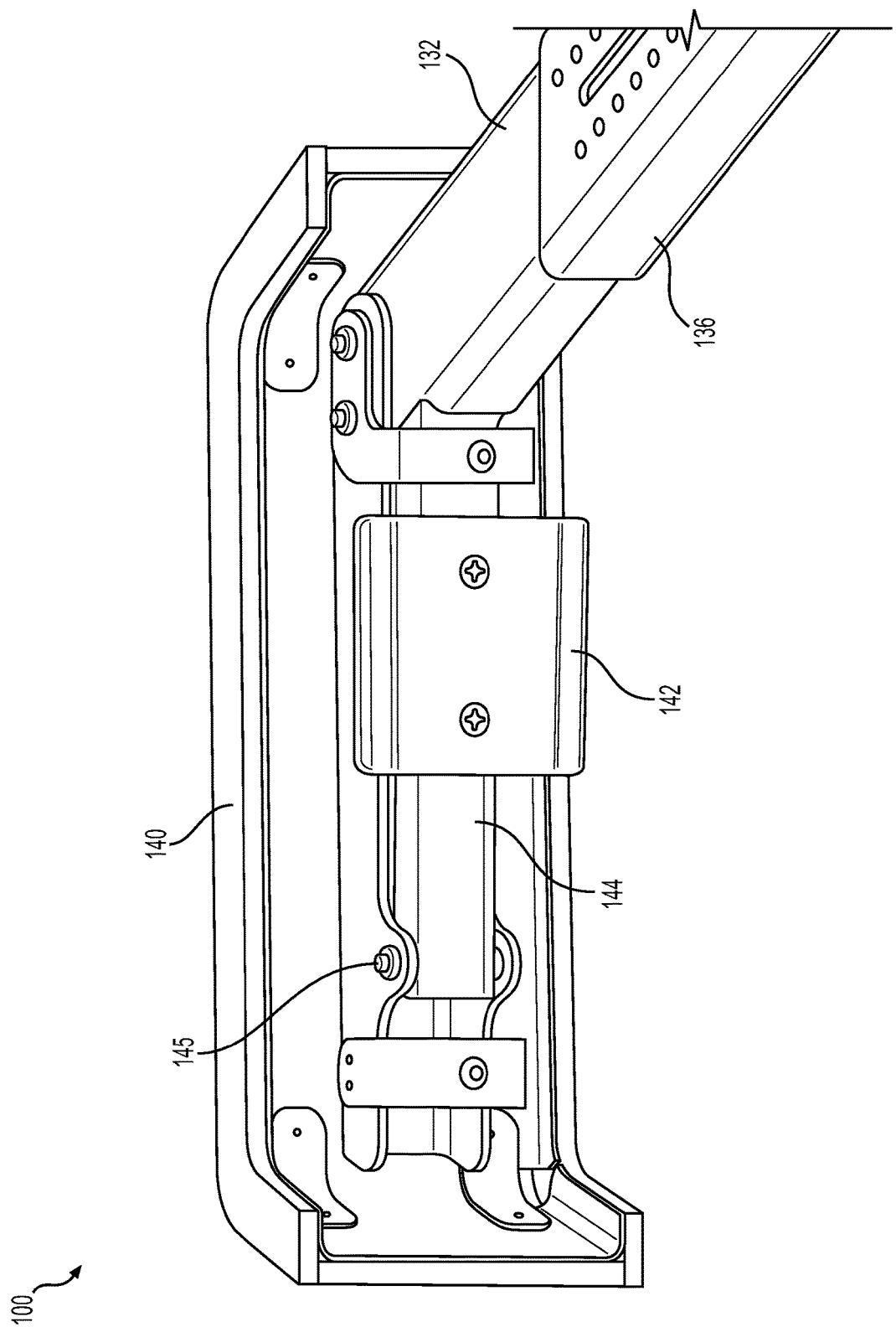
FIG. 15 shows a perspective view of a portion of the cockpit center console armrest of FIG. 1 with some components removed to enable viewing of underlying components.
Figure 16:
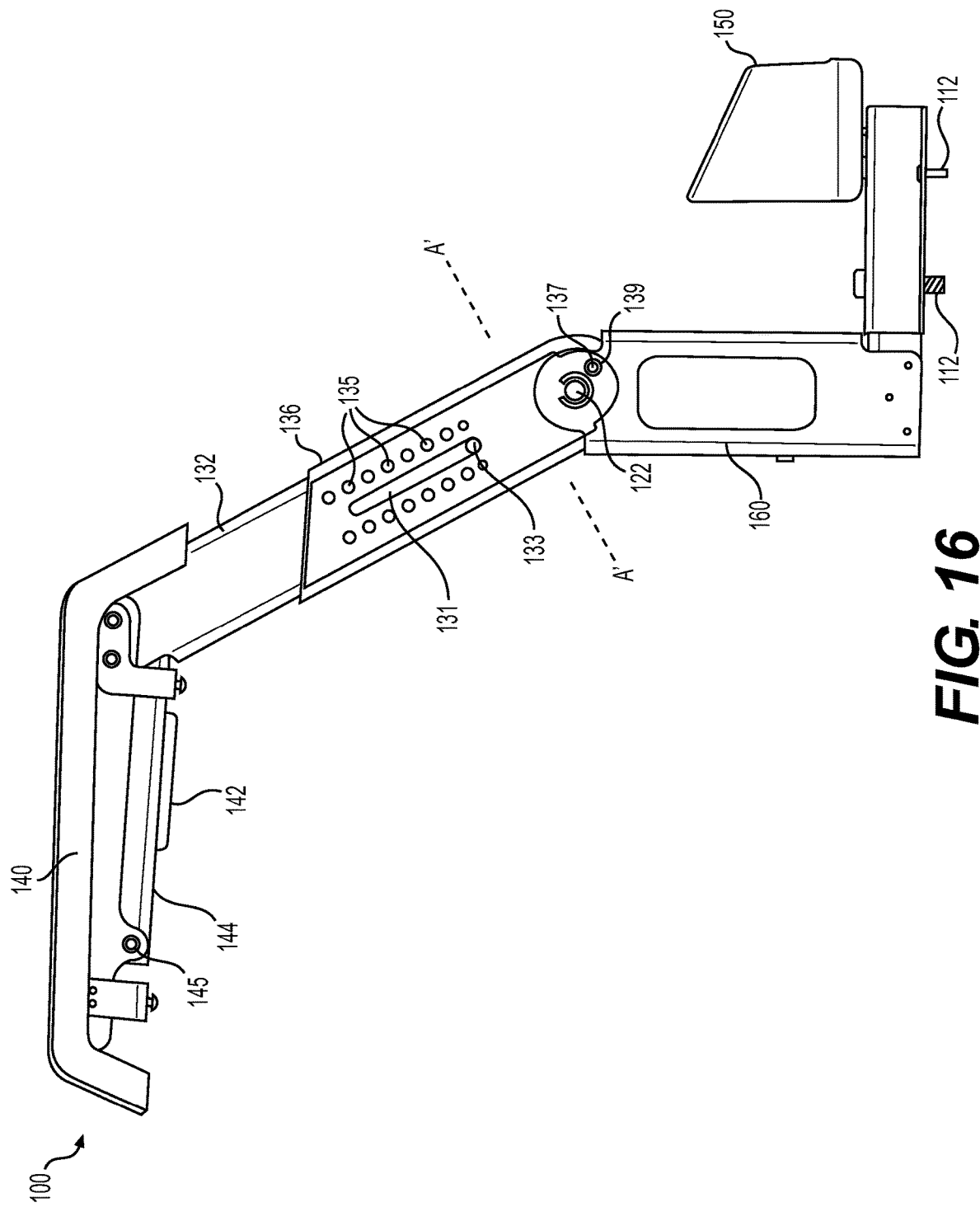
FIG. 16 shows a side view of the cockpit center console armrest of FIG. 1 with some components removed to enable viewing of underlying components.
Figure 17:
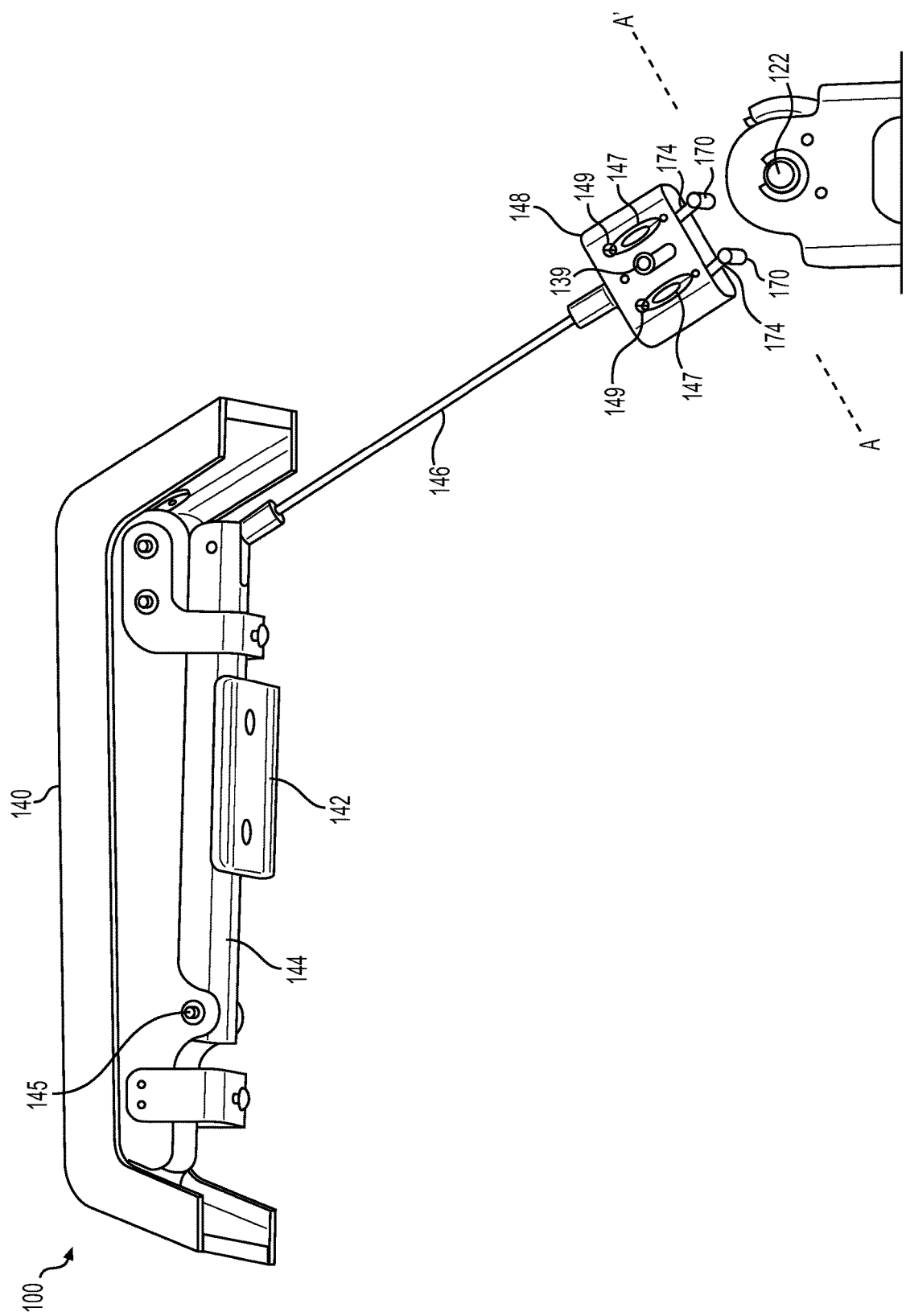
FIG. 17 shows a perspective view the cockpit center console armrest of FIG. 1 with some components removed to enable viewing of underlying components.
Figure 18:
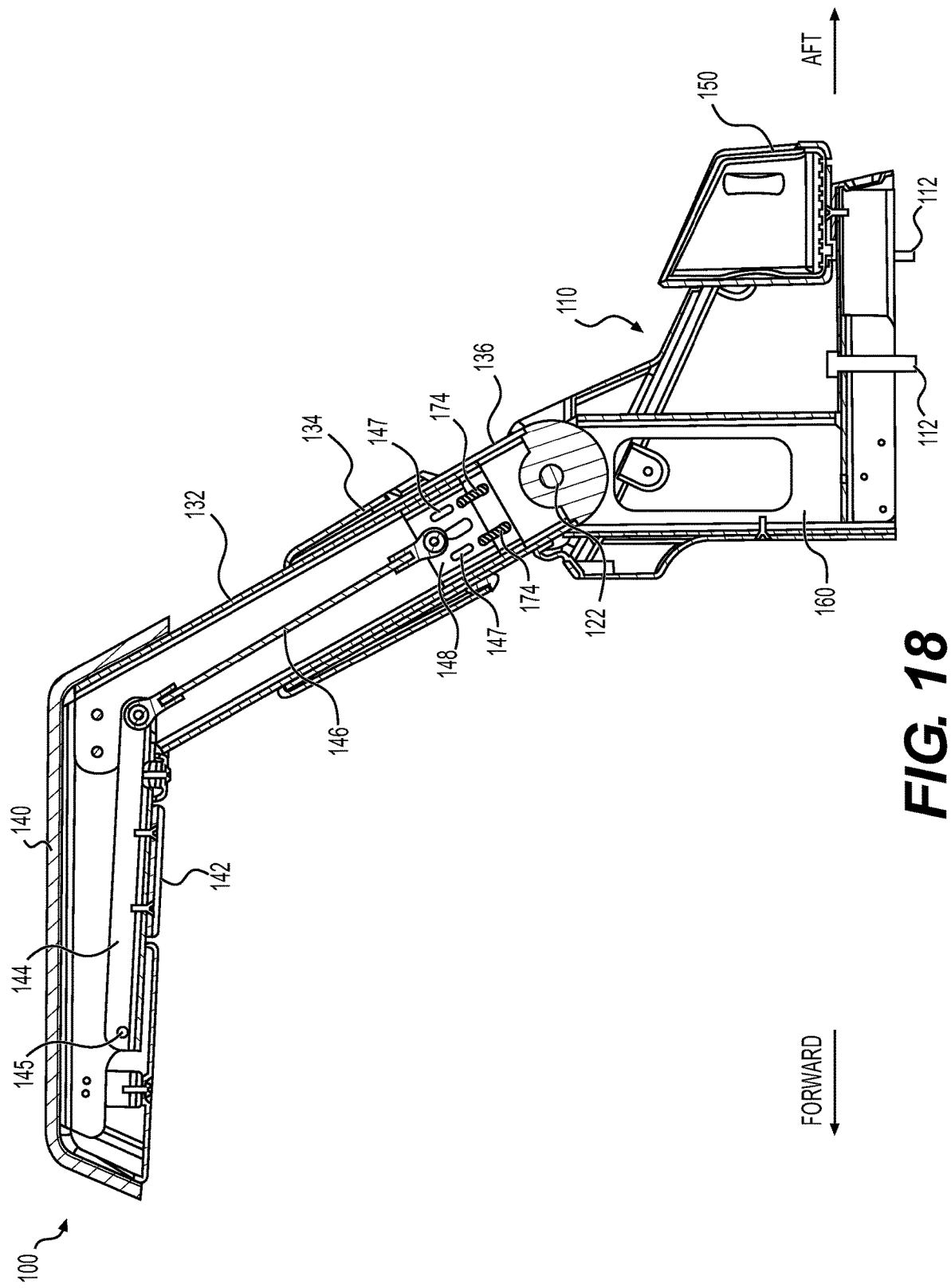
FIG. 18 shows a cross-sectional side view of the cockpit center console armrest of FIG. 1.

FIG. 15 shows a perspective view of armrest 140 with cover 143 and enclosure 134 removed to enable viewing of underlying components. FIG. 16 shows a side view of cockpit center console armrest 100 with cover 143, enclosure 134, and other components (e.g., an outer shell of base member 110) removed to enable viewing of underlying components. FIG. 17 shows a perspective view of armrest 140 with several components removed from view, including cover 143, enclosure 134, inner telescoping member 132, and outer telescoping member 136, to enable viewing of underlying components. FIG. 18 shows a cross-sectional side view of cockpit center console armrest 100. FIGS. 15-18 are best viewed together with the following description.

A pivot bar 144 inside armrest 140 is configured for pivoting about a pivot axis 145. Pivot axis 145 is for example a pivot pin that is secured to armrest 140 via a bracket. Pivot axis passes through holes of pivot bar 144. When lever 142 is pressed upwardly, pivot bar 144 pivots upwardly about pivot axis 145, thereby raising pivot bar 144 at an end opposite pivot axis 145. Pivot bar 144 is mechanically coupled with a connecting member 146 (see FIG. 17), which actuates a vertical adjustment mechanism, such that a height of armrest 140 may be raised or lowered.

As shown in FIG. 17, the vertical adjustment mechanism comprises a release mechanism 148. In embodiments, release mechanism 148 comprises a cam body having at least one groove 147. A ball bearing 149 is configured for moving within each of the at least one groove 147, respectively. The at least one groove 147 a forms a track aligned longitudinally within which ball bearing 149 is configured for moving along a respective groove 147. Each ball bearing 149 is for example a small metal ball configured for partially inserting into one of a plurality of holes 135 in outer telescoping member 136 (see FIG. 16). Not all holes 135 are enumerated in the drawings for clarity of illustration.

Referring again to FIG. 17, release mechanism 148 is mechanically coupled to an end of connecting member 146 opposite pivot bar 144. In an embodiment, connecting member 146 is a tie rod, such as an all-thread with devises at each end. As pivot bar 144 is raised upwardly via lever 142, connecting member 146 pulls release mechanism 148 upwardly. The upward movement of release mechanism 148 along the longitudinal direction coincident with connecting member 146 causes ball bearing 149 to move within its respective groove 147. Each respective groove 147 is shaped to be shallower at its ends and wider and deeper in the middle, which pushes each ball bearing 149 outwardly when release mechanism 148 is lowered and allows each ball bearing 149 to recede inwardly into its respective groove 147 when release mechanism 148 is raised. Receding of each ball bearing 149 inwardly causes retraction from one of the holes 135, thereby allowing outer telescoping member 136 to move with respect to inner telescoping member 132 for raising and lowering armrest 140. When lever 142 and armrest 140 are released, inner telescoping member 132 and release mechanism 148 settle downwardly until each ball bearing 149 is pressed outwardly via the top end of a respective groove 147, such that each ball bearing 149 is pressed into one of the holes 135 in outer telescoping member 136, which secures armrest 140 at a desired height.

Returning to FIG. 16, each side of outer telescoping member 136 (i.e., the side facing the viewer in FIG. 16 and the opposite side facing away) includes a plurality of holes 135. In embodiments, the plurality of holes 135 are arranged in two parallel rows per side (i.e., four rows total). In embodiments, each row of holes 135 is arranged longitudinally spanning a distance of three inches to provide three inches of adjustable positions for a height of armrest 140. Outer telescoping member 136 includes a slot 131 positioned between the two rows of holes 135. A pin 133 extends transversely from inner telescoping member 132 and protrudes into slot 131. Slot 131 has a predetermined length configured to limit travel of inner telescoping member 132 via pin 133. On the far side of outer telescoping member 136, opposite the view of FIG. 16, a second longitudinal slot in outer telescoping member 136 (not shown) configured for receiving a second transversely oriented pin (not shown) may also be included for limiting travel of inner telescoping member 132. As depicted in FIG. 16, armrest 140 is lowered into its lowest position, since pin 133 is located at the bottom of slot 131.

Returning to FIG. 17, at least one elastic member 174 is mechanically coupled to release mechanism 148 and outer telescoping member 136 via a first bar 170 (see FIG. 19) such that release mechanism 148 is biased downwardly towards base member 110. Elastic member 174 may comprise any material (e.g., a spring, a rubber material, a plastic material, etc.) that provides an elastic force when stretched. The at least one elastic member 174 is configured to retract release mechanism 148 to a lower position once lever 142 has been released. When release mechanism 148 is retracted to the lower position, each ball bearing 149 is moved to a top end of its respective groove 147, thereby pushing each ball bearing 149 outwardly into one of holes 135 in outer telescoping member 136. In this manner, armrest 140 is secured in one of the vertical positions determined via holes 135 when lever 142 is released.

Figure 19:
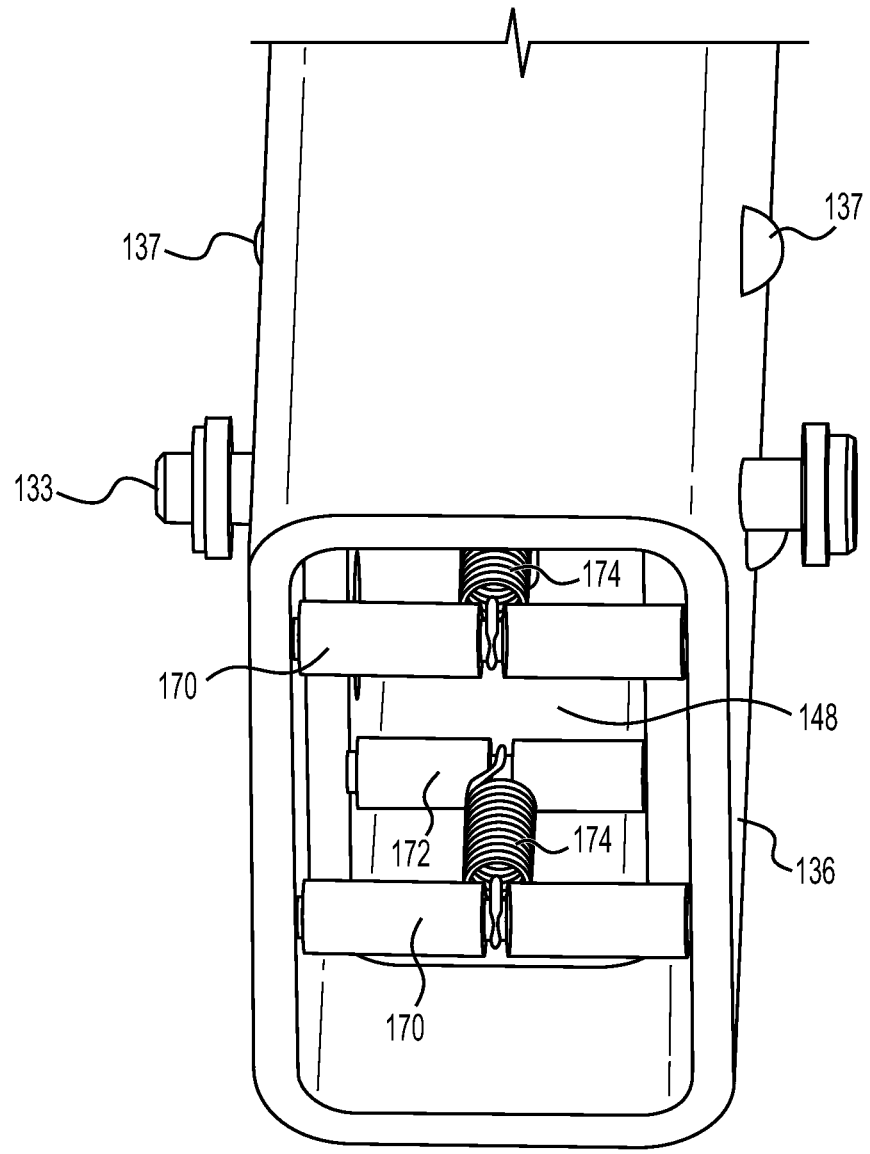
FIG. 19 shows a cross-sectional view through an outer telescoping member of the cockpit center console armrest of FIG. 1 taken at the A-A' line shown in FIGS. 16 and 17.

FIG. 19 shows a cross-sectional view through outer telescoping member 136 taken at the A-A' line shown in FIGS. 16 and 17. In the FIG. 19 embodiment, a pair of elastic members 174 are included. For each elastic member 174, a first bar 170 couples a first end of elastic member 174 with outer telescoping member 136 and a second bar 172 couples a second end of elastic member 174, opposite the first end, with release mechanism 148.

Returning to FIG. 16, a pivot axis 122 is configured for outer telescoping member 136 to pivot between the deployed orientation (shown in FIGS. 1-4, 8, 10, 12, 13, 16, and 19) and the retracted orientation (shown in FIGS. 5-7). Pivot axis 122 is for example a pivot pin or bearing pin that is supported by a vertical member 160 housed within base member 110. Pivot axis 122 passes through holes of outer telescoping member 136. Pivot axis 122 may be partially sheathed within a plain bearing inserted into holes of outer telescoping member 136 to reduce friction during movement of outer telescoping member 136. A detent 137 is partially inserted into a detent hole 139 in outer telescoping member 136. The detent 137 is configured to provide resistance to movement of outer telescoping member 136, such that unwanted movement of armrest 140 is avoided (e.g., during takeoff, landing, and other aircraft maneuvers). The resistance of detent 137 is configured to be easily overcome by a user lifting upwardly on armrest 140 (see FIG. 9) to move armrest 140 into the retracted orientation. A second detent (not shown) is configured to secure armrest 140 in the retracted orientation via detent hole 139. The detent can be said to releasably secure armrest 140 in the deployed or retracted orientations when partially inserted into one of the two holes in outer telescoping member 136, since the resistance provided by the detent, which can easily be overcome by a user, prevents unwanted movement of armrest 140.

Figure 20:
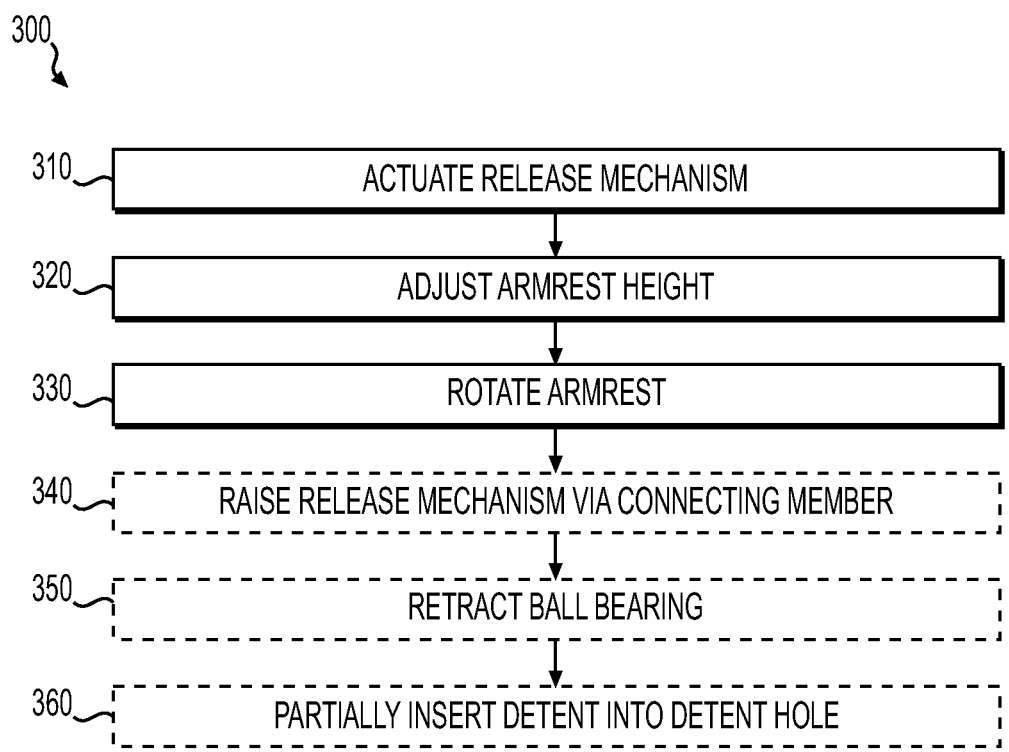
FIG. 20 shows a method for adjusting a cockpit center console armrest, in an embodiment.

FIG. 20 shows an exemplary method for adjusting a position of armrest 100.

In a step 310, a release mechanism is actuated via a release lever disposed on an underside of the armrest. In an example of step 310, release mechanism 148 is actuated via lever 142.

In a step 320, a height of the armrest is adjusted. In an example of step 320, inner telescoping member 132 slides with respect to outer telescoping member 136 when release mechanism 148 is actuated.

In a step 330, the armrest is rotated between a deployed orientation and a stowed orientation. In an example of step 330, outer telescoping member 136 rotates about pivot axis 145 for moving armrest 140 between the deployed orientation shown in FIGS. 1-4 and the retracted orientation shown in FIGS. 5-7.

In an optional step 340, the release mechanism is raised via a connecting member. In an example of step 340, lever 142, which is operatively coupled to a first end of connecting member 146, is used to pull connecting member 146. A second end of connecting member 146 is mechanically coupled to release mechanism 148 such that release mechanism 148 is raised via connecting member 146 when lever 142 is actuated.

In an optional step 350, the ball bearing moves within the groove to retract the ball bearing from a hole in the outer telescoping member. In an example of step 350, each ball bearing 149 moves within a respective groove 147 to retract ball bearing 149 from one of the plurality of holes 135 in outer telescoping member 136, thereby releasing inner telescoping member 132 for adjusting a height of armrest 140.

In an optional step 360, a detent is partially inserted into a detent hole of the outer telescoping member. In an example of step 350, detent 137 is partially inserted into detent hole 139 to provide resistance to pivoting about pivot axis 145 for preventing unwanted rotation of the armrest from the deployed orientation. In another example of step 350, detent 137 is partially inserted into a second detent hole configured to provide resistance to pivoting about pivot axis 145 for preventing unwanted rotation of the armrest from the retracted or stowed orientation.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all operations listed in the various figures need be carried out in the specific order described.

The invention claimed is:

1. A center console armrest, comprising:
   a base member configured for mounting to a floor;
   an extending member mechanically coupled to the base member;
   an armrest mechanically coupled to the extending member;
   wherein the extending member comprises an inner telescoping member configured for sliding within an outer telescoping member for adjusting a height of the armrest;
   a lever disposed on an underside of the armrest, the lever being configured for actuating a release mechanism configured for releasably securing the inner telescoping member to the outer telescoping member; and
   a pivot axis pivotably coupling the extending member to the base member such that the extending member is rotatable for rotating the armrest between a deployed orientation and a retracted orientation.

2. The center console armrest of claim 1, wherein the inner telescoping member is slidably coupled to the outer telescoping member, such that the inner telescoping member slides in a longitudinal direction within the outer telescoping member for adjusting a length of the extending member, thereby adjusting a height of the armrest.

3. The center console armrest of claim 1, further comprising a fuel sample container holder disposed within the base member.

4. The center console armrest of claim 1, wherein the outer telescoping member is pivotally coupled to the base member via the pivot axis.

5. The center console armrest of claim 4, further comprising:
   a detent hole through the outer telescoping member; and
   a detent configured for partially inserting into the detent hole,
   wherein the detent is configured to provide resistance to pivoting of the outer telescoping member thereby preventing unwanted rotation of the armrest.

6. The center console armrest of claim 1, further comprising:
   a connecting member having a first end and a second end, wherein the first end is operatively coupled to the lever;
   a release mechanism mechanically coupled to the second end of the connecting member, wherein the release mechanism comprises a groove and a ball bearing configured for moving along the groove; and
   a plurality of holes aligned longitudinally in the outer telescoping member, wherein the ball bearing is configured for partially inserting into one hole of the plurality of holes for securing a height of the armrest,
   wherein actuation of the lever raises the release mechanism via the connecting member such that the ball bearing moves within the groove to retract the ball bearing from the one hole thereby releasing the armrest for adjusting a height of the armrest.

7. The center console armrest of claim 6, wherein the groove is shaped to be shallower at each longitudinal end and wider and deeper in a middle portion, such that the ball bearing is pressed outwardly when moved towards either end of the groove, and the ball bearing recedes inwardly when moved towards the middle portion of the groove.

8. The center console armrest of claim 6, further comprising an elastic member mechanically coupling the release mechanism to the outer telescoping member such that the release mechanism is biased towards the base member.

9. A method for adjusting a position of a center console armrest, the armrest comprising a base member configured for mounting to a floor, an extending member mechanically coupled to the base member, an armrest mechanically coupled to the extending member, and a pivot axis pivotably coupling the extending member to the base member, the method comprising:
   actuating a release mechanism via a release lever disposed on an underside of the armrest, wherein the extending member comprises an inner telescoping member and an outer telescoping member, and the release mechanism releases the inner telescoping member for sliding within the outer telescoping member;
   adjusting a height of the armrest by raising or lowering the inner telescoping member with respect to the outer telescoping member when the release mechanism is actuated; and
   rotating the armrest between a deployed orientation and a stowed orientation via the pivot axis.

10. The method of claim 9, wherein actuating the release mechanism comprises:
    raising the release mechanism via a connecting member and the release lever, wherein the release lever is operatively coupled to a first end of the connecting member and the release mechanism is mechanically coupled to a second end of the connecting member, wherein the release mechanism comprises a groove and a ball bearing configured for moving along the groove; and
    retracting the ball bearing from a hole in the outer telescoping member as the release mechanism is raised thereby releasing the armrest for adjusting a height of the armrest.

11. The method of claim 10, further comprising partially inserting a detent into a detent hole of the outer telescoping member to provide resistance to pivoting about the pivot axis for preventing unwanted rotation of the armrest.

12. A cockpit center console armrest, comprising:
    a base member configured for mounting to a floor of an aircraft cockpit;
    an extending member mechanically coupled to the base member;
    an armrest mechanically coupled to the extending member;
    wherein the extending member comprises an inner telescoping member slidably coupled within an outer telescoping member, such that the inner telescoping member slides in a longitudinal direction within the outer telescoping member for adjusting a height of the armrest;
    a pivot axis pivotably coupling the outer telescoping member to the base member such that the extending member is rotatable for rotating the armrest between a deployed orientation and a retracted orientation;
    a lever disposed on an underside of the armrest;
    a connecting member having a first end and a second end, wherein the first end is operatively coupled to the lever;
    a release mechanism mechanically coupled to the second end of the connecting member, wherein the release mechanism comprises a groove and a ball configured for moving along the groove; and
    a plurality of holes aligned longitudinally in the outer telescoping member, wherein the ball is configured for partially inserting into one hole of the plurality of holes for securing a height of the armrest,
    wherein actuation of the lever raises the release mechanism via the connecting member such that the ball moves within the groove to retract the ball bearing from the one hole thereby releasing the armrest for adjusting a height of the armrest.

13. The cockpit center console armrest of claim 12, wherein the plurality of holes aligned longitudinally comprise a first row of holes aligned in parallel with a second row of holes, and the release mechanism comprises a first groove having a first ball bearing and a second groove having a second ball bearing, such the first ball bearing is configured for partially inserting into one hole of the first row of holes and the second ball bearing is configured for partially inserting into one hole of the second plurality of holes.

14. The cockpit center console armrest of claim 12, further comprising a pair of elastic members mechanically coupling the release mechanism to the outer telescoping member such that the release mechanism is biased towards the base member.

15. The cockpit center console armrest of claim 12, further comprising a fuel sample container holder disposed within the base member.

16. The cockpit center console armrest of claim 12, wherein the base member is mounted to the floor of the aircraft cockpit between a pilot seat and a co-pilot seat.

17. The cockpit center console armrest of claim 12, wherein the outer telescoping member includes a slot aligned longitudinally, and the inner telescoping member comprises a pin that extends transversely into the slot, such that sliding of the inner telescoping member is limited to a length of the slot via pin.

18. The cockpit center console armrest of claim 12, further comprising:
   a first detent hole through the outer telescoping member; and
   a detent configured for partially inserting into the first detent hole when the armrest is in the deployed orientation,
   wherein the detent is configured to partially resist pivoting of the outer telescoping member for preventing unwanted rotation of the armrest from the deployed orientation.

19. The cockpit center console armrest of claim 18, further comprising a second detent hole through the outer telescoping member, wherein the second detent hole is configured for receiving the detent when the armrest is in the retracted orientation for preventing unwanted rotation of the armrest from the retracted orientation.

20. The cockpit center console armrest of claim 18, wherein the resistance of the detent is configured to be overcome by a force exerted for raising or lowering the armrest.

* * * * *